United States Patent [19]
Holloway

[11] Patent Number: 5,393,186
[45] Date of Patent: Feb. 28, 1995

[54] STAPLE WITH PARALLEL LEGS AND TWO PARALLEL CROSS PIECES THEREBETWEEN

[76] Inventor: John G. Holloway, 1500 Magnolia St., Oakdale, Calif. 93361

[21] Appl. No.: 269,394

[22] Filed: Jun. 30, 1994

[51] Int. Cl.⁶ .............................................. A61B 17/04
[52] U.S. Cl. .................................... 411/475; 411/457; 411/920
[58] Field of Search ................ 227/63; 411/475, 457, 411/920

[56] References Cited

U.S. PATENT DOCUMENTS

| | | | |
|---|---|---|---|
| 202,786 | 4/1878 | Burnham | 411/920 |
| 366,555 | 7/1887 | Brewington | 411/920 |
| 644,471 | 2/1900 | Schon, Jr. | 411/457 |
| 1,774,212 | 8/1930 | Price | 411/920 |
| 1,841,353 | 1/1932 | Boggess | 411/475 |
| 2,308,611 | 1/1943 | La Place | 411/920 |
| 4,887,601 | 12/1989 | Richards | 411/457 |

Primary Examiner—Scott A. Smith

[57] ABSTRACT

A staple with parallel legs and two parallel cross pieces therebetween comprising a pair of parallel legs, the legs being formed with upper ends and lower ends, the lower edges being bevelled to facilitate movement into the surface to which the staple is to be secured; an upper first cross piece formed as an integral extension of the legs and extending therebetween at the upper end of the legs; and an intermediate second lower cross piece positioned parallel with the first upper cross piece at a location intermediate the ends of the legs and integrally formed therebetween, the entire staple including its legs and its first cross piece and its second cross piece being integrally formed of a rigid material.

4 Claims, 4 Drawing Sheets

STAPLE WITH PARALLEL LEGS AND TWO PARALLEL CROSS PIECES THEREBETWEEN

BACKGROUND OF THE INVENTION

1. Field of the Invention

The present invention relates to staple with parallel legs and two parallel cross pieces therebetween and more particularly pertains to forming a space across the head of a staple for being grasped by a pliers to facilitate removal.

2. Description of the Prior Art

The use of staples and other fastening devices of various designs is known in the prior art. More specifically, staples and other fastening devices of various designs heretofore devised and utilized for the purpose of removing staples by various tools or specific constructions of the staples themselves are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 330,699 to Gill discloses the design of an insulated staple.

U.S. Pat. No. Des. 298,916 to Beatty discloses the design of a staple.

U.S. Pat. No. 3,969,975 to Krol discloses a heavy duty staple.

U.S. Pat. No. 3,821,919 to Knohl discloses a staple.

U.S. Pat. No. 3,741,068 to Andruskiewicz discloses a wallboard staple.

U.S. Pat. No. 3,499,359 to Yrjanainen discloses an easy pull staple.

In this respect, the staple with parallel legs and two parallel cross pieces therebetween according to the present invention substantially departs from the conventional concepts and designs of the prior art, and in doing so provides an apparatus primarily developed for the purpose of forming a space across the head of a staple for being grasped by a pliers to facilitate removal.

Therefore, it can be appreciated that there exists a continuing need for new and improved staple with parallel legs and two parallel cross pieces therebetween which can be used for to form a space across the head of a staple for being grasped by a pliers to facilitate removal. In this regard, the present invention substantially fulfills this need.

SUMMARY OF THE INVENTION

In view of the foregoing disadvantages inherent in the known types of staples and other fastening devices of various designs now present in the prior art, the present invention provides an improved staple with parallel legs and two parallel cross pieces therebetween. As such, the general purpose of the present invention, which will be described subsequently in greater detail, is to provide a new and improved staple with parallel legs and two parallel cross pieces therebetween and method which has all the advantages of the prior art and none of the disadvantages.

To attain this, the present invention essentially comprises a new and improved staple with parallel legs and two parallel cross pieces therebetween comprising, in combination, a pair of parallel legs, the legs being formed with upper ends and lower ends, the lower edges being bevelled to facilitate movement into the surface to which the staple is to be secured; an upper first cross piece formed as an integral extension of the legs and extending therebetween at the upper end of the legs; and an intermediate second lower cross piece positioned parallel with the first upper cross piece at a location intermediate the ends of the legs and integrally formed therebetween, the entire staple including its legs and its first cross piece and its second cross piece being integrally formed of steel with the distance between the lower ends of the staple and the second cross piece being between about two and three times the distance between the first cross piece and the second cross piece and with the distance between the legs being between about two and three times the distance between the first cross piece and the second cross piece.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved staple with parallel legs and two parallel cross pieces therebetween which has all the advantages of the prior art staples and other fastening devices of various designs and none of the disadvantages.

It is another object of the present invention to provide a new and improved staple with parallel legs and two parallel cross pieces therebetween which may be easily and efficiently manufactured and marketed.

It is further object of the present invention to provide a new and improved staple with parallel legs and two parallel cross pieces therebetween which is of durable and reliable constructions.

An even further object of the present invention is to provide a new and improved staple with parallel legs and two parallel cross pieces therebetween which are susceptible of a low cost of manufacture with regard to both materials and labor, and which accordingly are then susceptible of low prices of sale to the consuming public, thereby making such staple with parallel legs and two parallel cross pieces therebetween economically available to the buying public.

Still yet another object of the present invention is to provide a new and improved staple with parallel legs and two parallel cross pieces therebetween which provide in the apparatuses and methods of the prior art some of the advantages thereof, while simultaneously overcoming some of the disadvantages normally associated therewith.

Still another object of the present invention is to form a space across the head of a staple for being grasped by a pliers to facilitate removal.

Lastly, it is an object of the present invention to provide new and improved staple with parallel legs and two parallel cross pieces therebetween comprising a pair of parallel legs, the legs being formed with upper ends and lower ends, the lower edges being bevelled to facilitate movement into the surface to which the staple is to be secured; an upper first cross piece formed as an integral extension of the legs and extending therebetween at the upper end of the legs; and an intermediate second lower cross piece positioned parallel with the first upper cross piece at a location intermediate the ends of the legs and integrally formed therebetween, the entire staple including its legs and its first cross piece and its second cross piece being integrally formed of a rigid material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
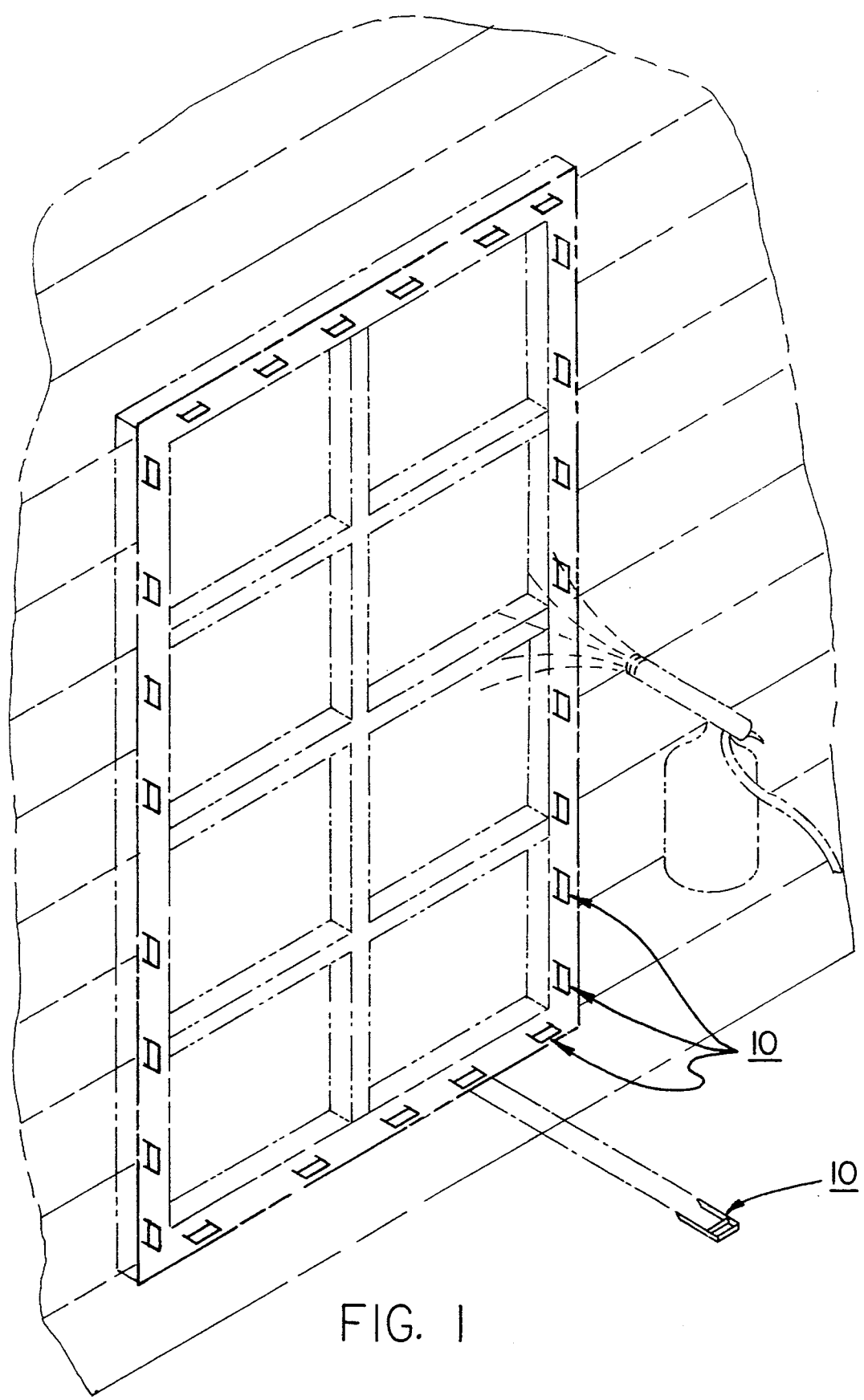
FIG. 1 is a perspective view of the preferred embodiment of the staple with parallel legs and two parallel cross pieces therebetween constructed in accordance with the principles of the present invention.
Figure 2:
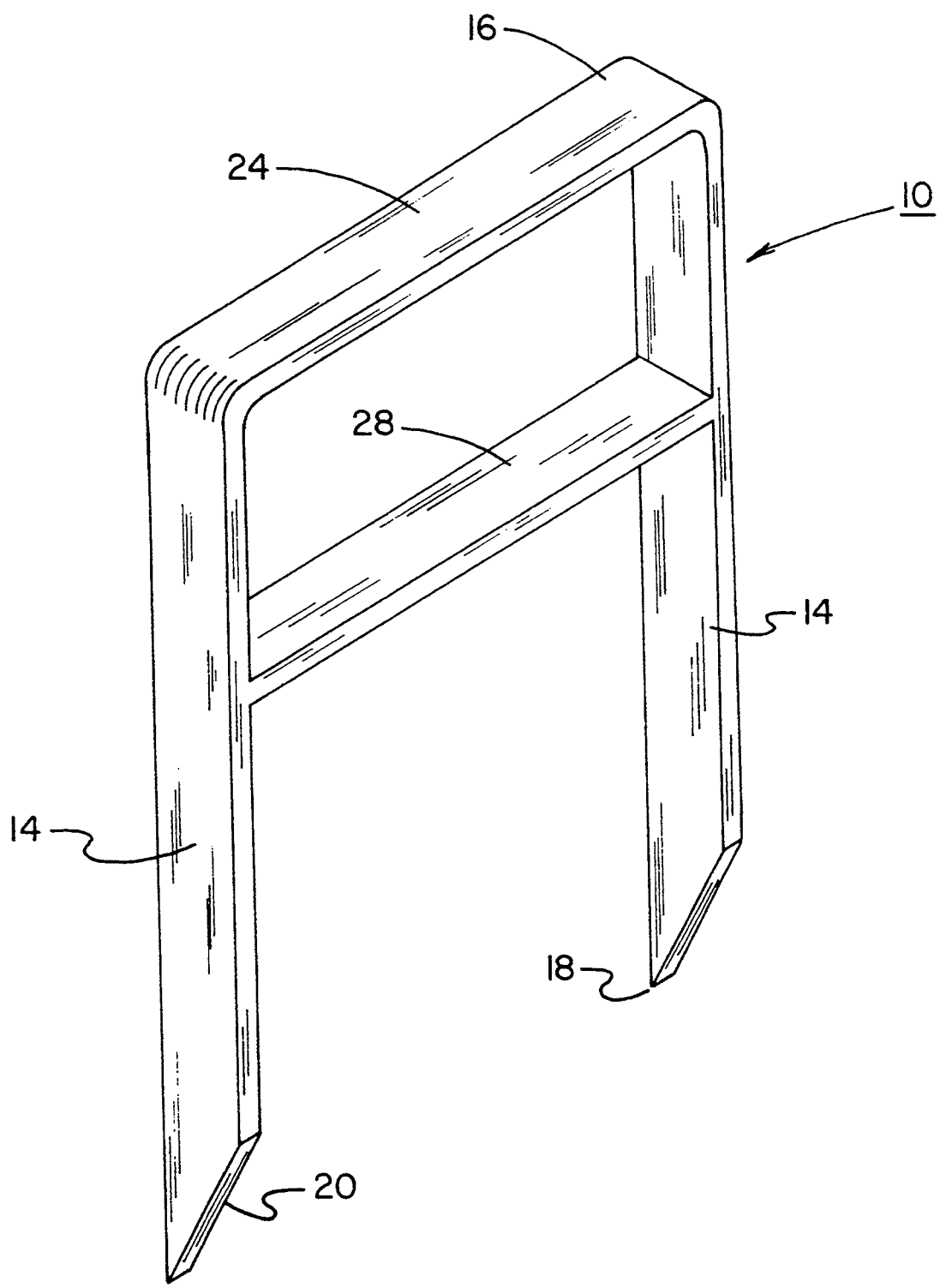
FIG. 2 is an enlarged perspective view of the staple illustrated in FIG. 1.
Figure 3:
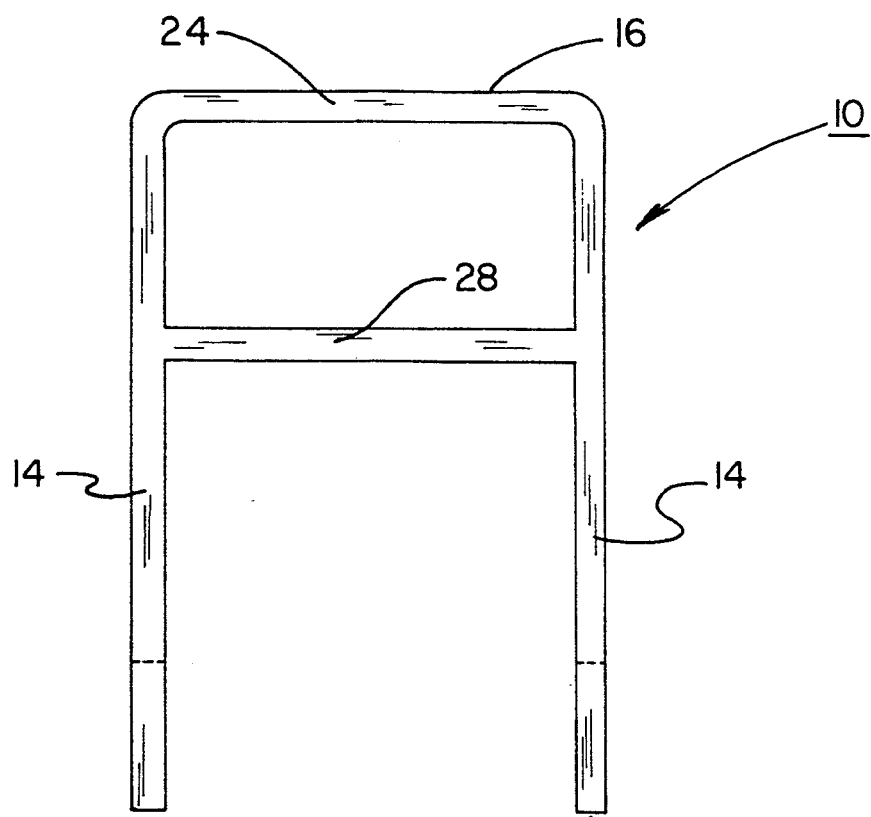
FIG. 3 is a front elevational view of the staple shown in FIGS. 1 and 2.
Figure 4:
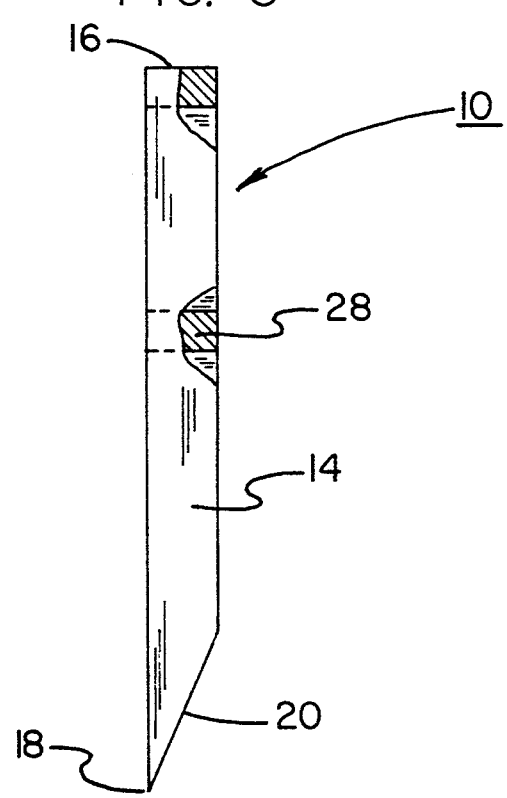
FIG. 4 is a side elevational view partly in cross section of the staple of the prior Figures.
Figure 5:
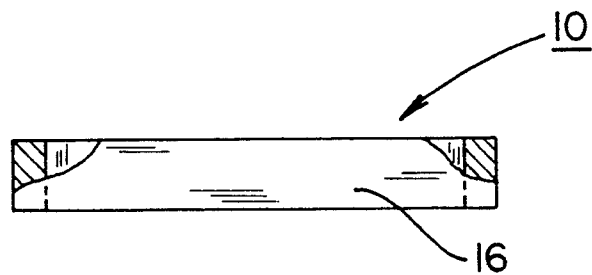
FIG. 5 is a top elevational view of the staple of the prior Figures with parts broken away to show certain internal constructions thereof.
Figure 6:
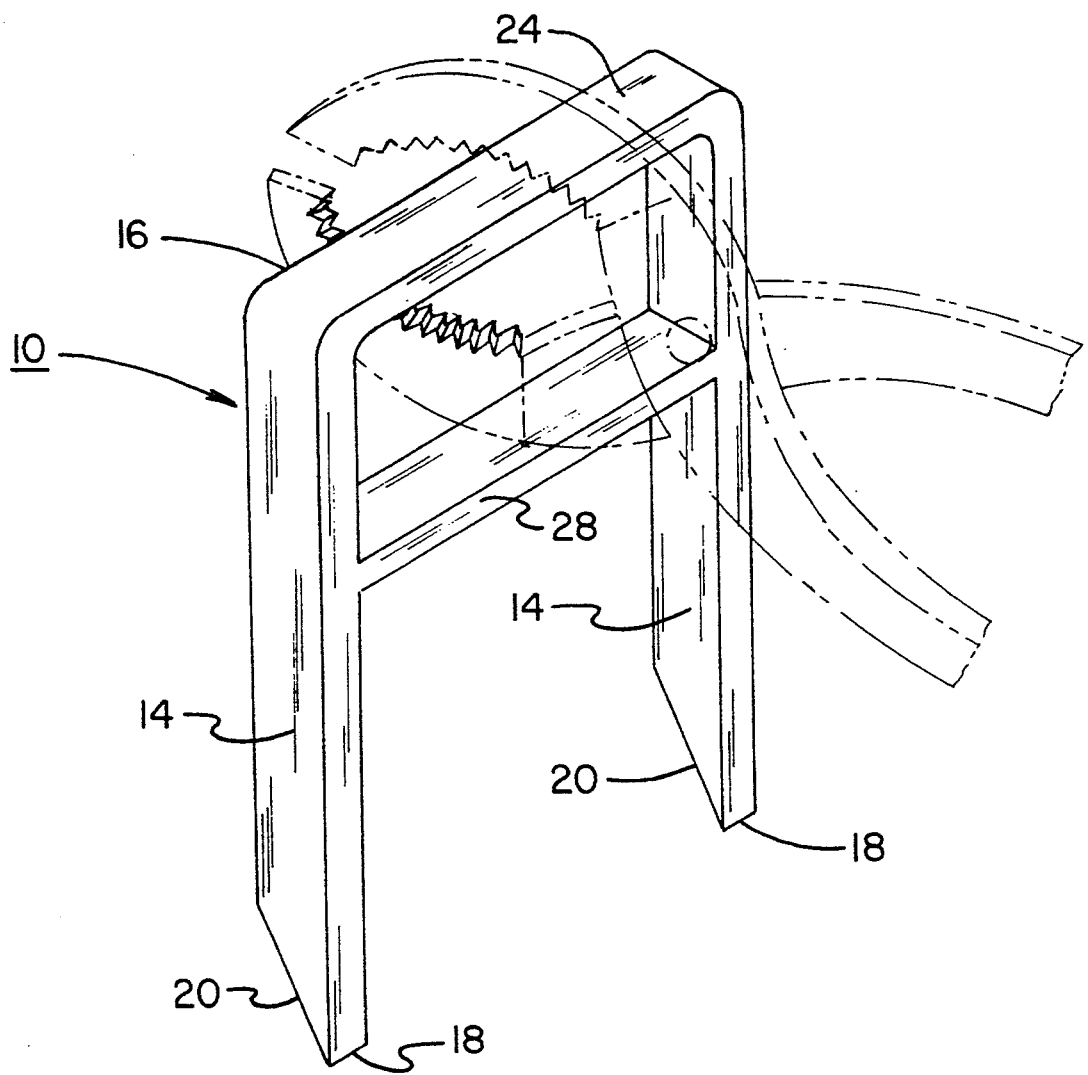
FIG. 6 is a perspective view similar to FIG. 2 but shown from the opposite side and with a pliers positioned for removal of the staple, The same reference numerals refer to the same parts through the various Figures.

With reference now to the drawings, and in particular to FIG. 1 thereof, the preferred embodiment of the new and improved staple with parallel legs and two parallel cross pieces therebetween embodying the principles and concepts of the present invention and generally designated by the reference numeral 10 will be described.

The present invention, the new and improved staple with parallel legs and two parallel cross pieces therebetween is comprised of a plurality of component elements. Such component elements in their broadest context, include parallel legs, a first cross piece and a second cross piece. Such components are individually configured and correlated with respect to each other so as to attain the desired objectives.

The present invention is in a staple which constitutes a system 10. Such staple includes, as is conventional, a pair of parallel legs 14. The legs are formed with upper ends 16 and lower ends 18. The lower ends are provided with bevels 20. Such bevels facilitate the movement of the lower ends of a staple into the surface to which the staple is to be secured.

In association with the legs is an upper or first cross piece 24. The first cross piece is formed as an integral extension of the legs. It extends between the legs at the upper ends thereof.

The next component of the system is an intermediate or lower second cross piece 28. Such second cross piece is positioned parallel with the first or upper cross piece. The second cross piece is at a location intermediate the ends of the legs. The second cross piece is also formed integrally with the legs and the first cross piece.

The entire staple including its legs and its first cross piece and its second piece are preferably integrally formed of a rigid material such as metal, preferably steel. The distance between the lower ends of the staple and the second cross piece is between about 2 and 3 times the distance between the first cross piece and the second cross piece. The distance between the legs is preferably between about 2 and 3 times the distance between the first cross piece and the second cross piece.

It should be understood, however, that the particular dimensions are, in large part, a function of the task intended to be performed with the staples of the present invention.

This is a specially designed staple for use in covering surfaces to be spray painted. In such jobs, doors, windows, and the like are often covered by something like #15 felt paper and secured with staples. Removing these staples at the end of the job is what causes problems. Workers often have to wedge a screwdriver or some other implement in between the wood and the top of the staple in order to remove it. Not so with the present invention.

The duplex design of this product makes it much easier to remove than conventional staples, and less damage is done to wood surfaces during removal. Less time during removal means that painting jobs can be completed more quickly, with less effort and cost.

The duplex feature comes in the top of the staple. Instead of just one horizontal piece across the top, as regular staples have, these new staples have two cross pieces. When the staple is driven in, it penetrates only as far as the lower cross piece. Hence, there is ample room to grab on to the upper cross piece when removing the staple. A special staple gun would be used for installation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved staple with parallel legs and two parallel cross pieces therebetween comprising, in combination:
   a pair of substantially straight parallel legs, the legs being formed with upper ends and lower ends, the lower edges being bevelled to facilitate movement into the surface to which the staple is to be secured;
   a substantially straight upper first cross piece formed as an integral extension of the legs and extending therebetween at the upper end of the legs; and
   a substantially straight intermediate second lower cross piece positioned parallel with the first upper cross piece at a location intermediate the upper and lower ends of the legs and being integrally formed to each leg and permanently affixed thereto and extending the entire length therebetween, the entire staple including its legs and its first cross piece and its second cross piece being integrally formed of steel with the distance between the lower ends of the staple and the second cross piece being between about two and three times the distance between the first cross piece and the second cross piece and with the distance between the legs being between about two and three times the distance between the first cross piece and the second cross piece.

2. A staple with parallel legs and two parallel cross pieces therebetween comprising:
   a pair of substantially straight parallel legs, the legs being formed with upper ends and lower ends, the lower edges being bevelled to facilitate movement into the surface to which the staple is to be secured;
   a substantially straight upper first cross piece formed as an integral extension of the legs and extending therebetween at the upper end of the legs; and
   a substantially straight intermediate second lower cross piece positioned parallel with the first upper cross piece at a location intermediate the upper and lower ends of the legs and being integrally formed to each leg and permanently affixed thereto and extending the entire length therebetween, the entire staple including its legs and its first cross piece and its second cross piece being integrally formed of a rigid material.

3. The staple as set forth in claim 2 wherein the distance between the lower ends of the staple and the second cross piece is between two and three times the distance between the first cross piece and the second cross piece.

4. The staple as set forth in claim 2 wherein the distance between the legs being between about two and three times the distance between the first cross piece and the second cross piece.

* * * * *